(12) United States Patent
Savage (10) Patent No.: US 8,926,218 B1
(45) Date of Patent: Jan. 6, 2015

(54) APPARATUS AND METHOD OF SUPPORTING UNDERGROUND FLUID AND WATER STORAGE AND RETENTION SYSTEMS

(76) Inventor: Edward W. Savage, Central Point, OR (US)

( * ) Notice: Subject to any disclaimer, the term of this patent is extended or adjusted under 35 U.S.C. 154(b) by 286 days.

(21) Appl. No.: 13/253,772

(22) Filed: Oct. 5, 2011

Related U.S. Application Data (60) Provisional application No. 61/390,832, filed on Oct. 7, 2010.

(51) Int. Cl.
*E02B 11/00* (2006.01)

(52) U.S. Cl.
USPC ........ 405/53; 405/51; 210/170.03; 137/236.1

(58) Field of Classification Search
USPC ......... 405/36, 43, 50, 52, 53, 55; 210/170.01, 210/170.03, 170.07, 170.08; 137/236.1
See application file for complete search history.

(56) References Cited

U.S. PATENT DOCUMENTS

| | | | | |
|---|---|---|---|---|
| 3,060,693 A | * | 10/1962 | Taylor | 405/43 |
| 3,693,664 A | * | 9/1972 | Schmunk | 138/111 |
| 4,318,892 A | * | 3/1982 | Von Kohorn | 422/279 |
| 5,015,123 A | * | 5/1991 | Houck et al. | 405/45 |
| 5,516,229 A | | 5/1996 | Atchley et al. | |
| 5,520,481 A | | 5/1996 | Atchley et al. | |
| 5,890,837 A | * | 4/1999 | Wells | 405/43 |
| 6,095,718 A | | 8/2000 | Bohnhoff | |
| 6,702,517 B2 | * | 3/2004 | Goddard | 405/45 |
| 7,559,720 B2 | | 7/2009 | Neden et al. | |
| 7,661,903 B1 | | 2/2010 | Maroschak et al. | |
| 8,240,950 B1 | * | 8/2012 | Everson | 405/51 |
| 8,256,990 B2 | * | 9/2012 | Koerner | 405/45 |

OTHER PUBLICATIONS

Cudo Cube by Cudo Stormwater Products, Inc., "Shaping the Future of Water Quality" www.cudocube.com 2009.
StormTank by Brentwood Industries, Stormwater Storage Modules. www.brentwoodprocess.com Nov. 2008.
Atlantis Water Mangement for Life, "Flo-Cell vertical & Horizontal Infiltration Solutions." www.atlantis-america.com 2008.
RainStor3 by Invisible Structures, Inc. for water storage and stormwater control Jan. 2003.
PTI Multi-Pipe Systems, the Alternative to Rock Drainfields. Plastic Tubing, Inc., for use in "rockless" septic systems and drain fields. 2009.

* cited by examiner

*Primary Examiner* — Tara M. Pinnock
(74) *Attorney, Agent, or Firm* — Fountainhead Law Group P.C.

(57) ABSTRACT

A structural support system creates and maintains useful void space for the storage or detention of fluids within an underground chamber. The support system includes one or more hollow members that are generally triangular in cross section, with open ends and a plurality of apertures that allow the hollow members to remain in fluid communication when bundled together. Stored or detained fluids flow around and through the support system as the fluid level rises or falls according to the volume of fluids introduced or withdrawn from the chamber.

20 Claims, 4 Drawing Sheets

APPARATUS AND METHOD OF SUPPORTING UNDERGROUND FLUID AND WATER STORAGE AND RETENTION SYSTEMS

CROSS REFERENCE TO RELATED APPLICATIONS

The present application claims priority to U.S. Provisional App. No. 61/390,832 for "Support Method for Underground Fluid and Water Storage and Retention Systems" filed Oct. 7, 2010, which is incorporated herein by reference.

BACKGROUND

1. Field of the Invention

This invention pertains generally to underground fluid and water storage and detention systems, and more particularly, to structural support beams placed inside an underground chamber.

2. Description of the Related Art

Unless otherwise indicated herein, the approaches described in this section are not prior art to the claims in this application and are not admitted to be prior art by inclusion in this section.

Water storage and detention is essential for any number of varied applications. Water shortages due to drought, excess demand or limited water delivery infrastructure are common and water storage is, in many areas, or under certain conditions, necessary or desirable for people's health, safety and well-being. Storm water detention and control is necessary to preserve public and private property and to comply with regulations of local and state governments, which regulations are becoming increasingly common and more broadly applied. There are also many commercial applications for water storage and control systems. Water storage systems are desired by homeowners seeking to have water available for irrigation, household use, fire suppression or to supplement water available from wells or water utilities. Commercial and industrial water users store water for use in irrigation, cooling, cleaning, washing and manufacturing processes. Water is stored on farms for use with crops and livestock and at hospitals for emergency use. Storm water is stored or detained temporarily to capture large water volumes and thus reduce pressure on flood control systems during storm events or to prevent excessive run-off and reduce pollution flowing into streams, rivers or the sea.

Common systems for storing water, collected from roofs and ground surfaces, include containers, barrels or tanks sitting above ground for relatively small quantities of stored water and, for those desiring to store large or mass quantities of water, large above ground tanks or a series of large tanks. These systems all suffer the disadvantages of occupying above ground or surface area on property that could be put to other use; they are unsightly and the quality of the water stored above ground is generally lower than that of water stored below ground. Water stored below ground is less subject to evaporation loss and can be stored longer with less contamination risk than can occur in stagnant water stored above ground.

One common type of water storage system below ground includes a variety of tanks or cisterns that are buried under the surface and do not present an unsightly view and allow for use of the surface area; in some cases the surface area can be heavily loaded by such uses as parking lots and roads. The disadvantages of these systems are that they are costly, disruptive to the site and expensive to install, and they require ballast to prevent them from rising up from the ground. The ballast is often in the form of heavy weights, made of concrete or other heavy materials, that hold down the tank or cistern, or, alternatively, in the form of the weight of a substantial quantity of water retained in the tank or cistern at all times. Retaining a substantial quantity of water in the tank or cistern has the major disadvantage of reducing its usable storage capacity.

Another type of below ground water storage system is a modular system that consists of a number of parts that constitute a support structure sitting inside an excavated chamber. The chamber is lined with an impermeable liner of plastic or rubber material if the chamber is used for water storage. Alternatively, the chamber is lined with permeable filter materials in the case of water detention uses that allow water to pass through and eventually percolate the detained water into the soil. The support structure of the chamber is designed to prevent the surrounding soil from collapsing into the void space of the chamber and thus maintain the chamber void space for water storage or detention. In some cases, the support structure also provides a heavier surface load bearing capability so the ground surface can be used for parking lots and roads. Modular support structures include vertical pipes, columns, boxes or panels set vertically on edge to support the surface loads and prevent the collapse of the chamber void space.

SUMMARY

The support structure system used in modular below ground water storage and detention systems relates to the strength of the system in terms of its surface load carrying capability and in the design flexibility of the system's shape and capacity. One issue with existing modular support structures is that they incur point loads at the ends of vertical pipes or columns, on the sides of boxes or on the edges of vertical panels. There is exposure to the risk of collapse in the event these point loads become excessive or the loaded vertical components move out of the vertical plane due to vibration, ground movement or earthquake.

Given the above discussion, there is an opportunity to improve underground modular water storage systems. An embodiment of the present invention is directed toward fluid and water-permeable structural support beams placed inside an impermeably lined or sealed underground chamber (or alternately, a permeably lined underground chamber), as a way of supporting the top and sides of such chamber against the pressure of the ground and other loads surrounding the chamber, thus maintaining the shape and volume of the chamber, while allowing water or other fluids to freely flow through the support beams and throughout the chamber.

An embodiment of the present invention generally pertains to a fluid-permeable, hollow member, generally triangular in the cross section aspect with three sides meeting at rounded corners, and of a variable length as required for a particular application, that provides the support structure method to maintain an underground chamber void space and to prevent its collapse from the weight of the surrounding soil, thus allowing the void space to be used for fluid storage or temporary fluid detention.

The hollow member, being generally triangular in cross section aspect with rounded corners, is fluid permeable, being open at the ends and perforated variously along its length with apertures at the corners, allows fluid to be received into and flow around and through the member.

The members may be banded together with strapping material to form a bundle of multiple hollow members when usage dictates a quantity of hollow members is required. This facilitates handling of the members when placed into an excavation and increases the load bearing strength of the members.

The members, when placed into an excavation, either singly or in one or more bundles of multiple members, substantially fills the space within the excavation and provides the support necessary to allow the excavation to be covered over with soil or other materials thus forming an underground chamber. The void space of the chamber is thus made up of the void space within the hollow members and around the exterior curves of the corners of the members. The void space is somewhat reduced by the amount of the material that physically composes the walls of the hollow members.

More specifically, an embodiment is directed toward an assembly for storing a fluid in a belowground chamber formed by displacing soil. The assembly includes a number of hollow members having a triangular cross-section. Each of the hollow members includes a number of apertures that permits the fluid to flow among the hollow members in the belowground chamber. The hollow members are arranged horizontally with respect to the belowground chamber (e.g., the chamber has a length, a width and a height; the members are arranged lengthwise or widthwise, but not vertically or heightwise). The members may provide lateral support to the walls of the chamber, as well as support for a covering of earth, pavement, etc.

The members may be grouped or bundled into one or more bundles that may be secured by straps. The bundles may include various numbers of members, for example six, ten, fourteen, eighteen, etc. Two bundles may be placed adjacent to each other, with two members spacing between the two bundles. A bundle may be stacked on top of another bundle.

The apertures may be located at the corners of the members. The corners may be rounded. The ends of the members may be open or closed. The apertures may be formed by cutting or sawing linear cuts at the corners.

The members may be covered by an impermeable liner that lines the outside of the members, to keep the fluid within the liner in the chamber. The members may be covered by a permeable filter fabric that lines the outside of the members, to permit the fluid to flow into the walls of the chamber at a rate according to the material of the permeable filter fabric.

The assembly may include an inlet pipe for increasing the amount of fluid in the chamber. The assembly may include an outlet pipe for decreasing the amount of fluid in the chamber. Since the apertures allow the fluid to flow among the members, the fluid level rises (or falls) as the fluid is increased (or decreased).

The members may be stacked such that they provide vertical support when movement of the soil occurs (e.g., an earthquake). Thus separate vertical support structures may be omitted, as the earthquake would otherwise cause vertical support structures to move out of vertical alignment.

The members may be spaced such that the majority of the fluid volume is contained within the members. Thus when movement of the soil occurs, formation of a continuous sloshing mass of fluid is avoided.

According to another embodiment, a method of creating a belowground chamber is disclosed. The chamber is formed by displacing soil, and is for storing fluid. The method includes providing a plurality of hollow members. Each of the members has a triangular cross-section, and each of the members includes a number of apertures that permits the fluid to flow among the members in the chamber. The method further includes arranging the plurality of hollow members horizontally with respect to the belowground chamber. In this manner, vertical support of the chamber is provided without vertical support structures. Further details are similar to those described above.

Some advantages of underground modular water storage and detention systems include: generally lower total installed cost than the tank or cistern types of storage system, and faster installation with less heavy equipment required and less site disruption during excavation. In addition, modular systems are adaptable to a wider variety of site conditions because they can be designed in a variety of shapes to conform to the site's available space and they can be designed in a wide range of storage capacities.

A feature of an embodiment of the invention is to provide structural support for an underground chamber. The generally triangular shape of the hollow member is an inherently strong load carrying form and, with appropriate wall material thickness, provides compressive load bearing capability to support a wide range of loads above the chamber, including the weight of the covering earth or other materials such as pavements or stones, and the weights of moving and parked vehicles.

Another feature of an embodiment of the invention, when used in multiple units or in bundles of multiple units, is to maintain the members in fluid communication thus allowing fluids to flow through and around the hollow members, and to allow the fluid level to rise and fall, and otherwise circulate within the chamber.

Another feature of an embodiment of the invention is to provide that the hollow members may be of a size and length to be used singly, or in bundles of members, or in multiples of bundles of members, so as to provide the volume of void space within the underground chamber that is required in order to contain the amount of fluid desired to be stored or detained, whether that amount is relatively small or very great. An example of a small chamber volume would be 1,000 gallons of fluid, and a very large volume would be 1,000,000 gallons (or a multiple thereof).

Another feature of an embodiment of the invention is for the hollow members to provide underground chamber support structure methods that permit the chamber to be in a variety of shapes such as squares or rectangles, or shaped in "H", "L", "T" or other forms so the size and shape of the chamber can be flexibly adapted to the requirements of the chamber site.

The following detailed description and accompanying drawings provide a better understanding of the nature and advantages of the present invention.

BRIEF DESCRIPTION OF THE DRAWINGS

Embodiments of the invention will be more fully understood by reference to the following drawings which are for illustrative purposes only.

DETAILED DESCRIPTION

Described herein are techniques for the underground storage of water. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, the terms "generally", "approximately", and "substantially" are used. These qualifying terms are to be considered to have the same meaning when modifying another word. In addition, the presence of these qualifying terms is assumed when referring to a feature (e.g., "triangular" is intended to be read as "generally triangular", "deforming" is intended to be read as "substantially deforming", etc.), and the qualifying term may be omitted for brevity. When an absolute qualification is needed, such will be noted explicitly (e.g., "exactly one inch").

Referring more specifically to the drawings, for illustrative purposes embodiments of the present invention are generally shown in FIG. 1 through FIG. 4. It should be noted that the drawings are not intended as a definition of the limits of the invention. It will be appreciated that the apparatus may vary as to configuration and as to details of the parts without departing from the basic concepts as disclosed herein.

Figure 1:
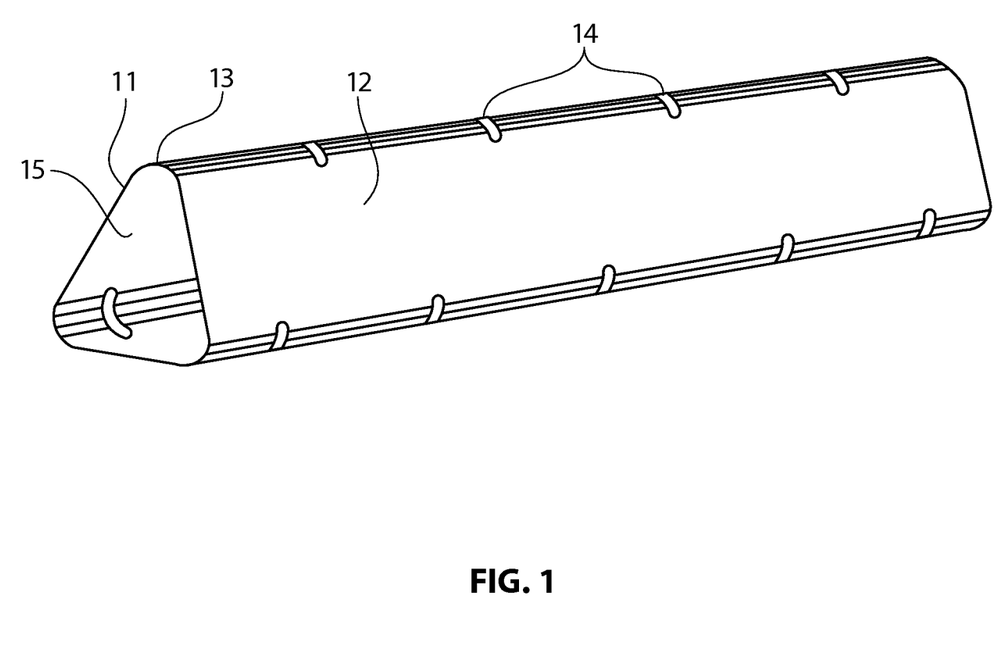
FIG. 1 is a perspective view of the hollow member in accordance with an embodiment of the present invention showing its generally triangular cross section shape, sidewalls with rounded corners and apertures spaced variously along the length of the hollow member.

Referring first to FIG. 1, a load bearing apparatus in accordance with an embodiment of the present invention includes a hollow member 12 of varied length, triangular in cross section shape, having corners 13 that are in an arc or a curve and a plurality of apertures 14 disposed along the curved corners 13 of the hollow member 12. The open ends of the hollow members 12 and the arc or curve of the corners 13 and the plurality of apertures 14 allow fluids to flow along the length of, and inside of, the hollow members 12 when used in multiples, eliminates trapping of air inside the hollow members 12 and allows the members 12 to be in fluid communication throughout the chamber 25 (see FIG. 4) in which they are installed. The walls 15 of the hollow member 12 can have a length and wall thickness 11 that varies according to the specific load bearing strength and void volume requirements of a given application for the apparatus. The length of the hollow member 12 is also variable according to the requirements of a given application. Numerous hollow members 12 or bundles of hollow members 16 (see FIG. 2) may be placed end to end to achieve a required length as needed for a given application.

The hollow member 12 may be made from a plastic material, for example high density polyethylene (HDPE) or polyvinyl chloride (PVC). HDPE may be used in certain embodiments where cost, inertness, and acid resistance are desired. HDPE may also be used in road construction applications for culverts and water detention systems and storm drains. The HDPE may be recycled material from food containers such as milk jugs and soft drink syrup barrels.

The thickness of the walls of the hollow member 12 may be between 0.045 and 0.050 of an inch for "normal duty" use. Normal duty use includes a shallowly-buried storage chamber 25 (see FIG. 4), for example supporting a load of 24" of soil cover above the liquid storage chamber. Normal duty use also includes surface use, such as yards, gardens, recreation fields, paved surfaces for patios and walkways and also light vehicle traffic and parking (auto and pickup trucks, medium weight work trucks). For heavier loads such as beneath commercial parking lots, general traffic roadways, heavy duty truck traffic and parking, the wall thickness of the hollow member 12 may be increased to 0.075" or more for "heavy duty" use.

Heavier loads are also addressed by certain engineering means such as making the buried fluid or water storage chambers 26 (see FIG. 4) narrower in width (which transfers surface loads more rapidly into the surrounding soil), or making the top soil cover deeper than 24". Up to certain limits, increasing the depth of the top soil cover, say to 30" or 36", spreads the top soil cover and surface use loads over a wider area and thus increases the load bearing strength of the underground support structure. Increasing the depth of the cover soil increases the load bearing capacity of the support structure until a point of diminishing returns is reached where the weight of the covering soil overcomes the benefit of spreading the load over the wider area.

Another load spreading approach that may be used, sometimes in combination with increasing the depth of the soil cover, is placing a geo-grid material in the covering soil. This is a strong plastic mesh that serves to spread surface loads over a wider area, without adding material additional weight.

Therefore, the "basic" or "normal duty" thickness of the walls of the hollow members 12 will support significant weight of covering earth and surface usage loads in combination with these engineering techniques. Further, going to a thicker wall such as 0.075" or more is an option to make a "heavy duty" version where the application demands it.

The hollow member 12 may be formed by extrusion, pressing the HDPE or PVC feedstock through a die of the appropriate size and passing the extrusion to other forming machines such as vacuum shapers to attain the desired shape and wall thickness. The members 12 are then cut to the desired length.

The members 12 are generally triangular in cross-section, with three walls (sides) 15 and three corners 13. The members 12 may have a base of approximately 3.25 inches and a height (base to apex) of approximately 4 inches. These parameters may be adjusted according to the load engineering requirements discussed above related to wall thickness. In addition, the roundedness of the corners 13 may be adjusted (according to design preference, manufacturing capability of the extrusion equipment, etc.) to become less rounded or more rounded. The corners 13 may include flat portions with the overall cross-section of the members 12 remaining generally triangular (e.g., the side walls 15 and base being the longest features of the cross-section).

The slotted apertures 14 may be cut by knives or saws. Preferred knives, called Flying Knives in the extrusion trade, are spinning knives that gouge out the aperture slot. A punch or saw process may also be used depending upon the equipment available in the manufacturing plant and whether that equipment can punch or cut the aperture slot without deforming the extrusion. The apertures 14 may be linear as shown in FIG. 1, cut perpendicular to the body of the member 12 (also as shown in FIG. 1). Alternatively, the apertures 14 may be cut parallel to the body of the member 12. As other alternatives, the apertures 14 may be circular, square, rectangular, or ovoid in shape.

Figure 2:
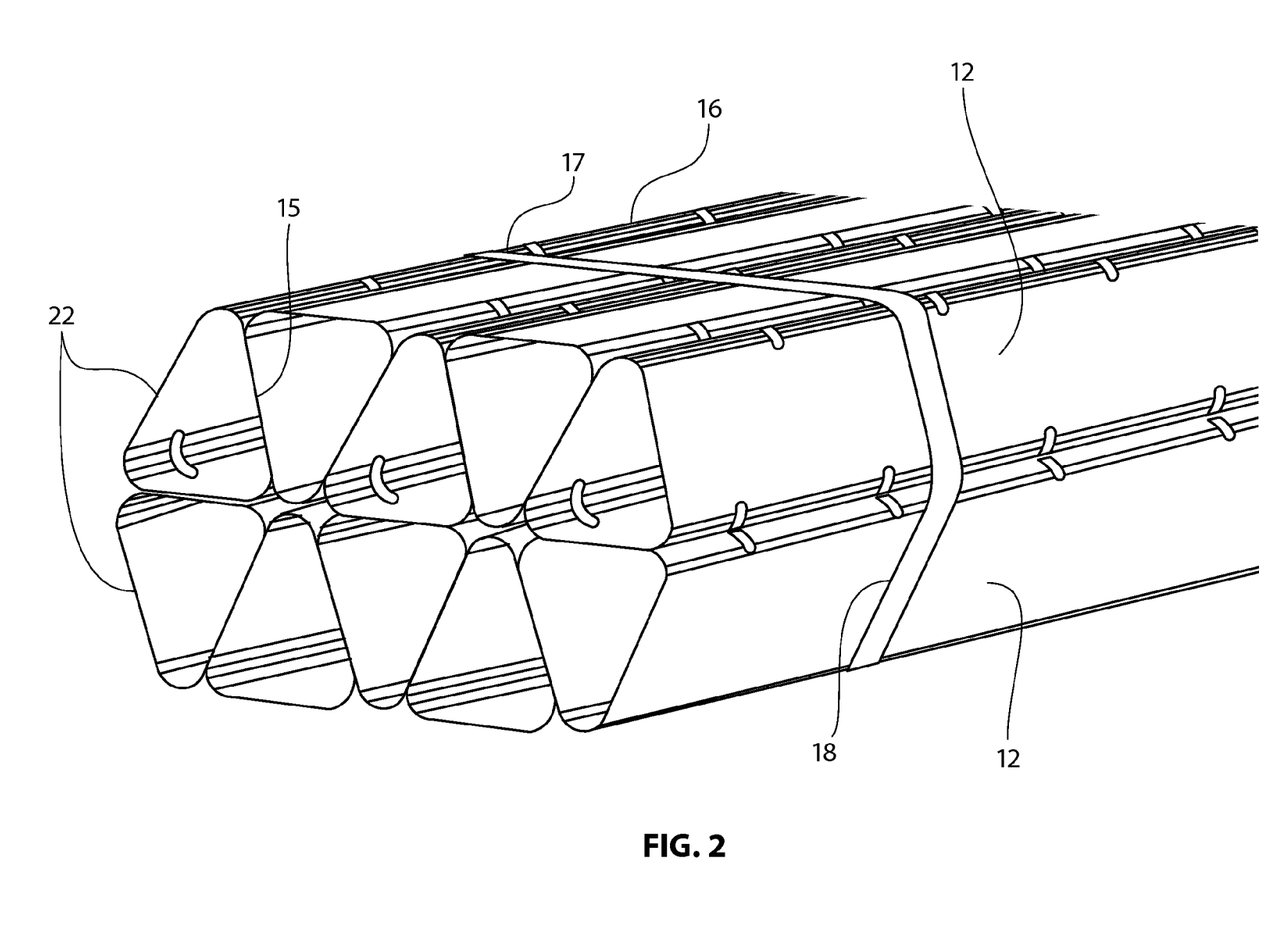
FIG. 2 is a perspective view of a preferred embodiment of the hollow member shown in FIG. 1, grouped into a bundle of ten pieces, the bundle being held together by a strap.

Referring to FIG. 2, the hollow members 12 can be grouped together in a bundle 16 held together by one or more straps 17 disposed along the length of the apparatus. The straps 17 may be made of polyester or other plastic material of appropriate strength and flexibility.

The triangular cross section shape of the hollow members 12 allows them to nest together in an up and down configuration 22 with the side walls 15 of the hollow members 12 in contact with each other. The bundle 16 increases ease and speed of handling of the hollow members 12 and also increases the load bearing strength of the apparatus. The bundle 16 configuration may consist of six or ten (or 14, 18, etc.) hollow members 12, thus allowing the bundle strap 17 to lay smoothly 18 around the perimeter of the bundle 16. The size of a bundle 16 of ten members has a height of approximately 8 inches and a width of approximately 12 inches, according to an embodiment.

Figure 3:
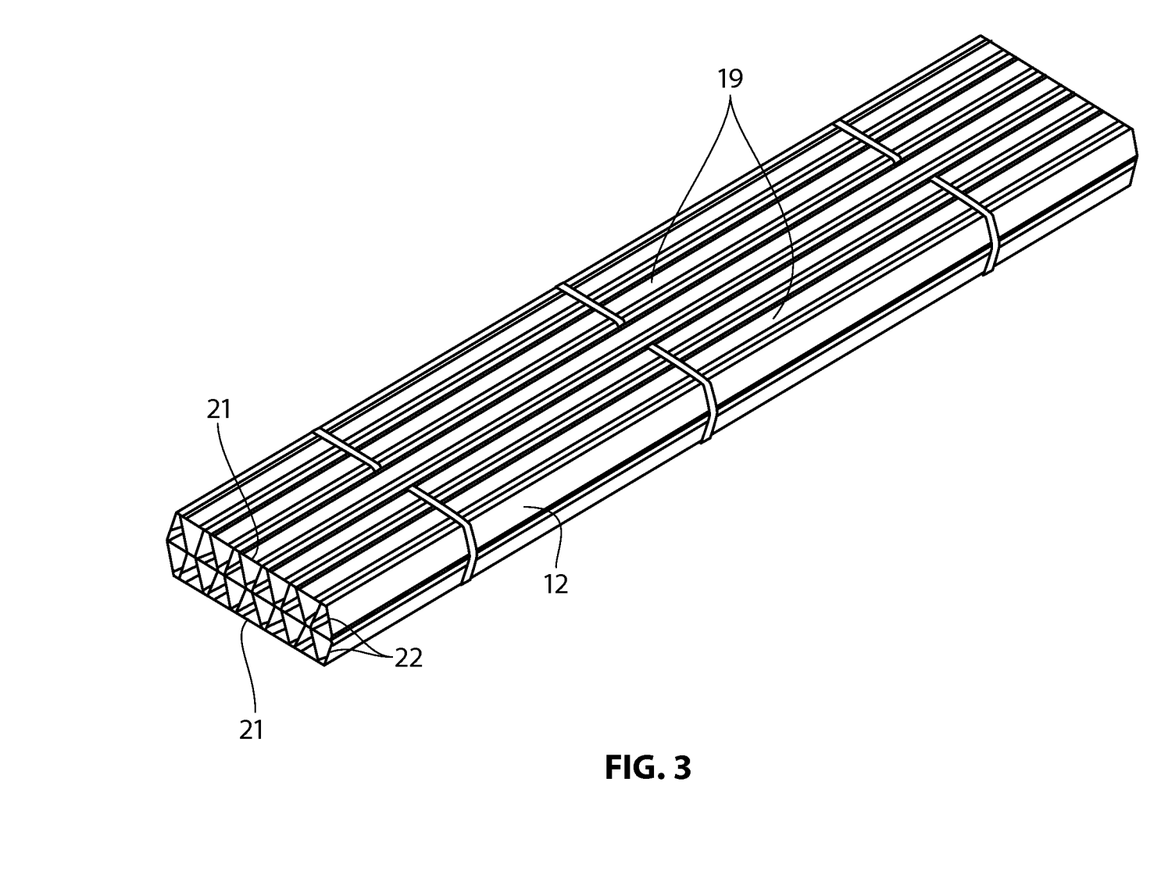
FIG. 3 is a perspective view of the bundle of hollow members shown in FIG. 2 placed side-by-side with a second similar bundle and showing two singular hollow members placed between the bundles so as to provide a continuous series of hollow members across the width of the bundles.
Figure 4:
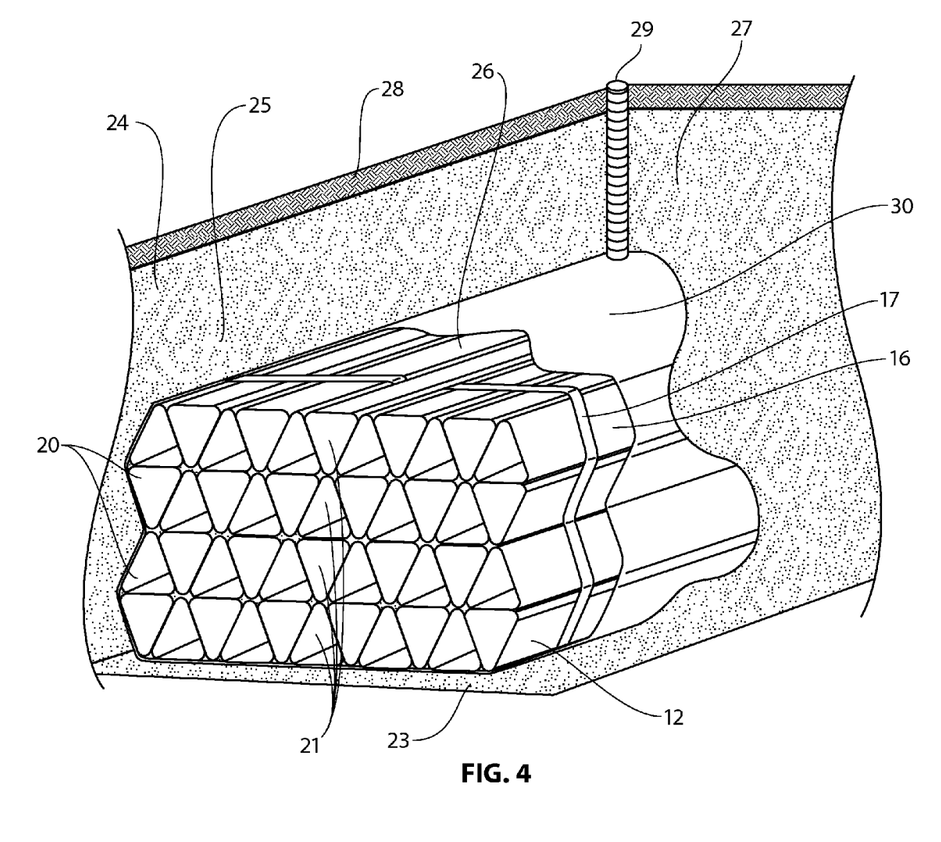
FIG. 4 is a perspective view of the invention grouped into bundles shown in FIG. 3, placed inside an excavation, demonstrating its use to create and support an underground void space for fluid storage or detention by supporting the covering earth and surface loads and preventing the collapse of the chamber.

As seen in FIG. 3, multiple bundles 19 of hollow members 12 can be laid side by side and, as seen in FIG. 4, stacked on top of each other 20. When the strapped bundles 16 are laid side by side (as 19), individual hollow members 12 are placed as spacers 21 between the bundles 16 in an up and down arrangement 22 to provide continuity of the configuration of hollow members 12 inside of and between the bundles 16.

FIG. 4 is a cut-away drawing that illustrates the placement of hollow members 12, grouped into bundles 16, inside of an excavation 25 in the earth (e.g., in soil). The excavation floor 23 and the excavation wall 24 define the boundaries of the excavation 25. The bundles 16 of hollow members 12 are held together by straps 17 and hollow members 12 used as spacers 21 between the bundles in the manner described in FIG. 3. The bundles 16 are stacked on top of each other (as 20) and, taken as a whole, provide the structural support for the earth surrounding the sides and covering the top of the stacked bundles 20 of hollow members 12, thus creating an underground chamber 26. The weight of the surrounding and covering earth 27 is supported by the invention in this illustration and the useful void space or chamber 26 for the storage or detention of fluids is maintained underground. The depth of the covering earth 27 may be varied according to the requirements of the application and may include surface pavement 28 or other surface materials. In this illustration, the bundles 16 of the hollow members 12 are wrapped in an impermeable liner 30 of rubber, plastic or other material or, alternatively, wrapped in a permeable filter fabric, as may be required by the specific fluid storage or detention application.

For further clarity of the use of the chamber 26, a fluid inlet pipe 29 is shown as an example of one of the means by which fluids enter and exit the chamber 26. A fluid outlet pipe (not shown) may be included in other embodiments. Alternatively, a single pipe may provide both inlet and outlet functionality. As fluid is introduced into the chamber 26, it flows among and between the members 12 as allowed by the apertures 14, thereby raising the collective fluid level in the chamber 26. Similarly, as fluid is removed from the chamber 26, the apertures 14 generally allow the collective fluid level to be lowered.

As discussed above, the ends of the members 12 may be open and, with the apertures 14, allow fluids to flow between and among the bundles 16 and/or 20 in the chamber 26. According to another embodiment, the ends of the members 12 may be closed; e.g., using triangular end caps, extending the liner 30, etc.

As discussed above, the corners 13 may be rounded (arced). In other embodiments, the corners may be angular or otherwise non-rounded.

A noteworthy feature of an embodiment of the invention is that it provides structural support for an underground chamber in a manner that does not require or rely on vertical supports to hold up the chamber ceiling and the weight of earth and other loads above the ceiling. The hollow member with its generally triangular aspect, singly or in bundles or in multiples of bundles, provides a means of support for the ceiling and related loads that spreads the weight broadly through the walls of, and along the length of, the hollow members, and does not incur point loads associated with vertical support structures such as poles, walls, girders or panels. As a result of the wide spreading of the loads in a manner that does not employ structures that must remain in vertical plane at all times to maintain their load bearing integrity, the invention avoids the potential for collapse of the chamber in the event of vehicular vibrations (e.g., caused by a nearby train), earthquake, lateral movement, or other shifting of the earth that could cause vertical components to move out of vertical plane. More generally, movement of the earth may include lateral (back-and-forth and side-to-side) as well as vertical (up-and-down) components; these components affect vertical support structures by moving them out of vertical alignment, so an embodiment of the present invention provides vertical support without using vertical support structures.

An additional feature of an embodiment of the invention is that the heavy weight of the surrounding and covering earth and potential additional surface loads such as pavements, vehicles, equipment, and planters, to name only a few, is distributed widely over the bundles 16 of hollow members 12. For example, the bundles 16 may be stacked such that the weight of the surrounding earth is distributed broadly across and through the surfaces and sidewalls of the members 12 that prevents small, concentrated points of overloading. Thus, there need be no structural elements such as vertical poles, panels, walls or other vertical fittings or components that rely on loaded vertical strength to support the top of the chamber 26. As a result, there are no structural components of the chamber 26 that can collapse due to an earthquake, traffic vibration or other earth movement and the integrity of the chamber 26 void space is maintained. Alternatively, vertical structural elements may be included as well.

A further feature of an embodiment of the invention relates to the fact that fluids stored or detained within an underground chamber can, during an earthquake, constitute a unified, heavy weight mass that sloshes violently inside the chamber and against the walls of the chamber, causing damage to conventional vertical supporting structures and causing the chamber to collapse. In underground chambers 26 supported by this invention, fluids stored or detained inside the chamber 26 are contained within the walls 15 of the hollow members 12 and fluid movement is constrained, preventing violent sloshing of a heavy mass and further protecting the chamber 26 from damage or collapse.

Although the members 12 are described above as "hollow", in other embodiments the members 12 may include structures or other features therein. For example, the members 12 may include baffles therein. The baffles further prevent sloshing of the fluid in the chamber 26.

As shown in FIG. 4, the chamber 26 formed by the members 12 may be generally rectangular, with the members 12 oriented lengthwise in parallel with the largest dimension of the chamber 26. However, the members 12 may also be cut shorter (than shown in FIG. 4) and oriented perpendicular to the largest dimension of the chamber 26. The orientation of the members 12 may also be mixed within a particular chamber 26, for example with short bundles oriented perpendicular to the largest dimension of the chamber 26, stacked atop long bundles oriented in parallel with the largest dimension.

In addition, other shapes of chambers may be made according to design desires or other factors. For example, two rectangular chambers may be placed adjacent to form an "L" shape or a "T" shape. Three rectangular chambers may be placed adjacent to form a "U" shape, a "C" shape, an "I" shape, or an "H" shape. Four rectangular chambers may be placed adjacent to form an "O" shape. The adjacent chambers need not meet at right angles, for example to form an "A" shape or a "V" shape.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. An assembly for storing a fluid in a belowground chamber formed by displacing soil, comprising:
 a plurality of hollow members arranged within a belowground chamber for storing a fluid, wherein each of the plurality of hollow members is formed by a single member, wherein each of the plurality of hollow members has a triangular cross-section, wherein the triangular cross-section has a base and a height, wherein the height is greater than the base, wherein each of the plurality of hollow members includes a plurality of apertures that permits the fluid to flow among the plurality of hollow members in the belowground chamber, and wherein the plurality of hollow members is arranged horizontally with respect to the belowground chamber,
 wherein the plurality of hollow members provides lateral support to at least one wall of the belowground chamber, and
 wherein the plurality of hollow members provides structural support to at least one side and a top of the belowground chamber to support a covering of earth above the belowground chamber.

2. The assembly of claim 1, further comprising:
 a plurality of straps that group the plurality of hollow members into a plurality of bundles.

3. The assembly of claim 1, wherein the plurality of hollow members are grouped into a plurality of bundles, including a first bundle having ten hollow members and a second bundle having ten hollow members, wherein two hollow members space between the first bundle and the second bundle.

4. The assembly of claim 1, wherein the plurality of hollow members are grouped into a plurality of bundles including a first bundle, a second bundle and a third bundle, wherein the first bundle is adjacent to the second bundle, and wherein the third bundle is on top of the second bundle.

5. The assembly of claim 1, wherein one of the plurality of hollow members has three sides and three corners between the three sides, wherein the three corners are rounded, and wherein at least some of the plurality of apertures are located at the three corners.

6. The assembly of claim 1, wherein the plurality of apertures comprises a plurality of linear cuts in the plurality of hollow members.

7. The assembly of claim 1, wherein the plurality of hollow members have at least one end that is closed.

8. The assembly of claim 1, wherein the plurality of hollow members have at least one end that is open.

9. The assembly of claim 1, further comprising:
 an impermeable liner that lines an outside of the plurality of hollow members.

10. The assembly of claim 1, further comprising:
 a permeable filter fabric that lines an outside of the plurality of hollow members.

11. The assembly of claim 1, further comprising:
 an inlet pipe that is configured to introduce the fluid into the belowground chamber, wherein the plurality of apertures allow a fluid level of the belowground chamber to rise as the fluid is introduced.

12. The assembly of claim 1, further comprising:
 an outlet pipe that is configured to remove the fluid into the belowground chamber, wherein the plurality of apertures allow a fluid level of the belowground chamber to lower as the fluid is removed.

13. The assembly of claim 1, wherein the plurality of hollow members are arranged in a stack to provide vertical support in an absence of vertical support structures.

14. The assembly of claim 1, wherein the plurality of hollow members are arranged in a stack to provide vertical support when movement of the soil occurs.

15. The assembly of claim 1, wherein the plurality of hollow members are arranged in a stack to provide vertical support when movement of the soil occurs, in contrast with vertical support structures that move out of vertical alignment when the movement of the soil occurs.

16. The assembly of claim 1, wherein more than half of a total volume of the fluid in the belowground chamber is stored within the hollow members.

17. The assembly of claim 1, wherein more than half of a total volume of the fluid in the belowground chamber is stored within the hollow members such that during movement of the soil, formation of a continuous sloshing mass of the fluid is avoided.

18. A method of creating a belowground chamber, formed by displacing soil, for storing fluid therein, comprising:
 providing a plurality of hollow members arranged within a belowground chamber for storing a fluid, wherein each of the plurality of hollow members is formed by a single member, wherein each of the plurality of hollow members has a triangular cross-section, wherein the triangular cross-section has a base and a height, wherein the height is greater than the base, wherein each of the plurality of hollow members includes a plurality of apertures that permits the fluid to flow among the plurality of members in the belowground chamber, wherein the plurality of hollow members provides lateral support to at least one wall of the belowground chamber, and wherein the plurality of hollow members provides structural support to at least one side and a top of the belowground chamber to support a covering of earth above the belowground chamber; and arranging the plurality of hollow members horizontally with respect to the belowground chamber.

19. The assembly of claim 1, wherein the plurality of hollow members include a plurality of baffles therein, wherein the plurality of baffles prevent the fluid from sloshing in the belowground chamber.

20. The assembly of claim 1, wherein the triangular cross-section has side walls, wherein adjacent members of the plurality of hollow members are arranged in an up and down configuration with the side walls in contact with each other to increase a load bearing strength of the assembly.

\* \* \* \* \*